United States Patent [19]

Ridgway et al.

[11] Patent Number: 4,565,941
[45] Date of Patent: Jan. 21, 1986

[54] OSCILLATORY DRIVE MECHANISMS FOR A RING LASER GYRO

[75] Inventors: Peter C. Ridgway, Laleham; John A. Geen, Bracknell, both of England

[73] Assignee: British Aerospace PLC, London, England

[21] Appl. No.: 436,335

[22] Filed: Oct. 22, 1982

[30] Foreign Application Priority Data

Oct. 28, 1981 [GB] United Kingdom ............... 8132437

[51] Int. Cl.⁴ ........................ F16F 1/18; H01L 41/08
[52] U.S. Cl. ................................. 310/328; 267/160; 310/36; 310/330
[58] Field of Search ............... 310/328, 330, 331, 332, 310/365, 322, 324, 333, 334, 338, 345, 36; 267/160

[56] References Cited

U.S. PATENT DOCUMENTS

| | | | |
|---|---|---|---|
| 3,928,778 | 12/1975 | Ivanov et al. | 310/331 |
| 4,349,183 | 9/1982 | Wirt et al. | 310/328 |
| 4,431,934 | 2/1984 | Kleinschmidt et al. | 310/331 |
| 4,435,666 | 3/1984 | Fukui et al. | 310/328 |
| 4,443,729 | 4/1984 | Rider | 310/332 |

Primary Examiner—Peter S. Wong
Assistant Examiner—D. L. Rebsch
Attorney, Agent, or Firm—Cushman, Darby & Cushman

[57] ABSTRACT

An oscillatory drive mechanism for a member to be driven comprises a flexural element (12) having a first portion (14) rigidly attached to a datum with respect to which the member is to be driven, and a second portion (15) rigidly attached to the member, the first and second portions (14,15) being interconnected by one or more first interconnecting members (17) which in the main determine the spring characteristics of the flexural element (12), and one or more second interconnecting members (18) having a dimension, generally in the direction of drive, less than the corresponding dimension of each first interconnecting member (17) and at least one of the second interconnecting members (18) having drive means (21) attached which, when energized, flexes the associated second interconnecting member, which in turn moves the second portion (15) of the flexural element relative to the first portion (14) so as to oscillate the driven member.

14 Claims, 7 Drawing Figures

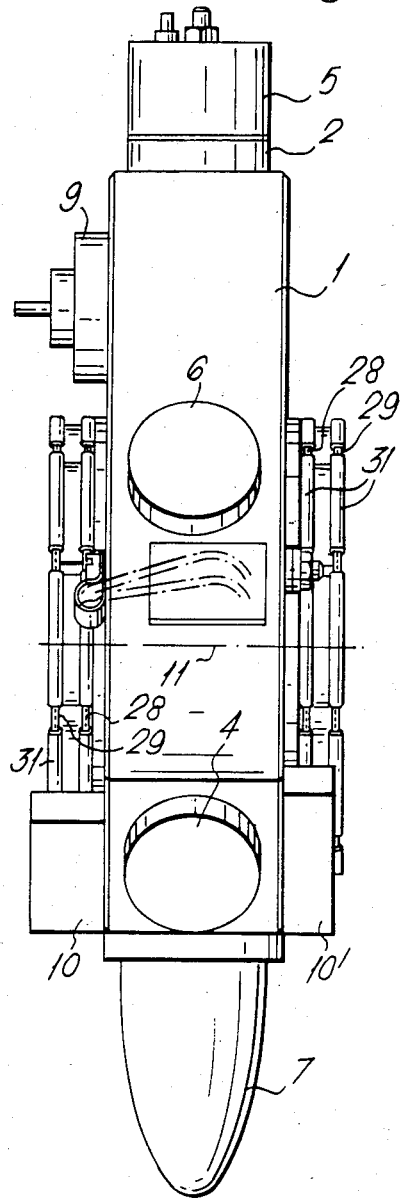
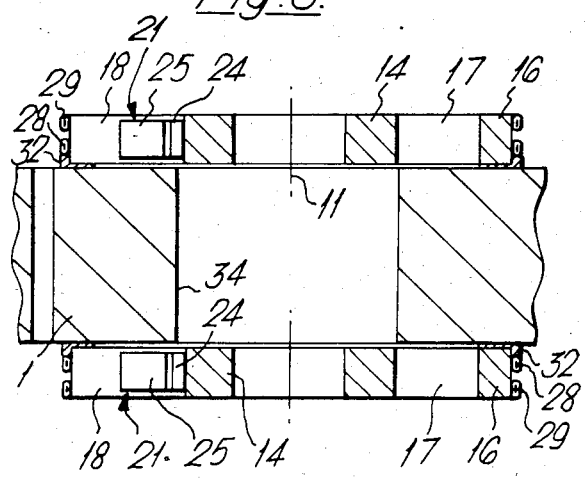
Fig. 2.
Fig. 3.

OSCILLATORY DRIVE MECHANISMS FOR A RING LASER GYRO

This invention relates to oscillatory drive mechanisms in general although it has particular application to ring laser gyroscopes in connection with which it will, in the main, be discussed. However, it is to be understood that the invention has a much wider application.

As is well known, a ring laser employs two beams of light which are propagated in opposite directions around the ring or so-called cavity. The cavity is typically of triangular or rectangular form and may be of a modular construction or an integral construction. In a modular ring laser one limb, or part, is formed by a laser which produces the contra-propagating beams of light which are transmitted to the remainder of the ring through Brewster angle windows. In an integral cavity, the limbs of the ring communicate directly with each other and the ring is filled with a lasing medium which produces the desired contrapropagating beams of light.

In an ideal ring laser, the frequency difference between the beams of light is zero when the ring is stationary but moves from zero when the ring is rotated about a sensitive axis which is an axis extending at right angles to the plane of the ring. Thus, the frequency difference between the two contra-propagating beams of light is proportional to the angular rotation rate of the ring about the sensitive axis. Therefore, a ring laser is capable of functioning as a rate gyroscope. In practical ring lasers, however, there are many defects which degrade the performance, and the majority of these are linked in some way to the amount of light that is lost in the contra-propagating beams of light traversing the ring. One of the most dominant, and hence troublesome effects is so-called "lock-in" which is caused by light scattered from each beam interacting with the opposite beam, suppressing the frequency difference at low rotation rates, and making the frequency difference non-linear at just above the lock-in frequency.

In a ring laser gyroscope, the contra-propagating beams of light are directed around the ring by mirrors disposed at the transitions between adjacent limbs of the ring. Normally, one of these mirrors is partially transmissive, whereby part of each beam passes therethrough to provide an output light beam, the two output light beams being combined to provide interference fringes which may be counted by a photo detector. The fringe count is directly proportional to the total angle through which the ring laser has turned, provided the two beams of light are completely uncoupled. The ratio of the fringe count per unit angle of rotation is known as the scale factor. As a result of lock-in, no fringes will occur up to the lock-in threshold and the scale factor will be non-linear for a range of rotational rates above the lock-in threshold, both these phenomena seriously degrading the accuracy of the ring laser gyroscope.

One method of avoiding the lock-in problem is to impart a bias to the ring laser such that a non-reciprocal phase shift is introduced into the two contra-propagating light beams. Various biassing techniques have been proposed ranging from a mechanical arrangement (known as "dither"), which oscillates the entire ring laser at a small amplitude, to magneto-optical arrangements which do not involve physical oscillation of the ring laser. The present invention is applicable to ring lasers employing the dither biassing technique.

In the dither biassing method the cavity is subjected to oscillatory motion about its sensitive axis. The amplitude and frequency of the oscillatory motion are sufficient to ensure that the instantaneous angular velocity of the cavity is above the lock-in threshold for all but a small fraction of the period of operation. However, the implementation of this angular oscillatory motion is complicated by several factors.

Firstly, the area of the lasing path is set by requirements of gyroscope performance and this in turn determines the ring or cavity geometry and consequently, the mass and inertia of the ring. The frequency and amplitude can be traded off one against the other to achieve the necessary angular velocity but system operation often dictates that the choice of frequency is constrained to the range of 100 to 300 Hz so that a typical requirement is for a system capable of dithering a cavity having an inertia of the order of 5,000 kg mm$^2$ at an amplitude of ±5 arc minutes at a frequency of 200 Hz. The RMS motion energy is about 5 mJ. The oscillatory motion in terms of velocity ideally is a square wave but energy limitations dictate a sinusoidal motion.

Secondly, the oscillatory motion is required only about the dither axis of the ring. It is necessary, therefore, to constrain the cavity in its other degrees of freedom in order to maintain the stability of the sensitive axis alignment.

The twin requirement of fixed frequency and high peak torque has led towards a design based on the resonant response of a tuned spring/inertia system. In such a system the ring is supported on a suspension which allows angular freedom in one axis but no freedom in any other axes. Movement in the free axis is spring restrained in proportion to the deflection from rest. Motion is simple harmonic, with the natural frequency dependent upon the spring stiffness and the moment of inertia of the ring.

One known suspension system comprises two springs mounted concentrically on respective sides of a ring or cavity block. Each spring is of wheel form having an outer rim connected to the cavity, and an inner hub fixed to a shaft which is rigidly connected to a relatively massive base. The rim and hub are interconnected by a plurality of radially extending spokes. The spokes are thin lamina with the centre planes co-planar with the dither axis. The spring stiffness is a function of the spring geometry and mechanical properties of the material from which the spring is made. The dimension of the spokes in the general direction of desired movement of the cavity can be chosen such as to provide the required stiffness for angular movement of the cavity about the polar axis but the dimension at right-angles thereto can be such as to provide high stiffness in other directions. The springs can be excited by any method but a known method is that of providing on one or more spokes a piezoelectric device. The or each piezoelectric device is energised such that it attempts to change its length in the direction of the spoke and hence transmits a force through the material bonding the device to the associated spoke with the net result that the spoke bends slightly over the length of the piezoelectric device. If the or each piezoelectric device is energized using an alternating voltage of a frequency which is tuned to the natural frequency of motion of the cavity, then the motion of the cavity will increase to a peak limit dependent on the Q of the system.

With such a known system, the performance is limited for two reasons. Firstly, the amplitude of the oscillatory motion is relatively small due to poor coupling of the energy, and the Q of the system is relatively low, typically in the range of 50 to 100. Investigation has shown that the main cause of the low Q is the energy loss in the material bonding the piezoelectric devices to the respective spokes, this material typically being an epoxy resin. The repetitive tension/compression cycles of the visco-elastic bonding material are hysteretic and, therefore, "lossy". The use of other stronger bonding materials such as metallic or other non-metallic adhesives has been found to result in a higher Q for the system but unfortunately they suffer a short life due to bond failure as a result of the repetitive tension/compression cycles.

An in-depth appraisal of the dither system has shown that there are three distinct functions involved, namely:
1. Ring or cavity support/mounting with one angular degree of freedom.
2. Resonant spring/inertia system.
3. Excitation system.

To obtain the best overall design, it is now considered that the design solution of each function should be such as to have no interaction with the other functions. This was not the case in the known system discussed above since the excitation performance was degraded by the positioning of the piezoelectric devices on the spring spokes which form the resonant spring system.

According to one aspect, the present invention provides an oscillatory drive mechanism for a member to be driven comprising a flexural element having a first portion adapted to be rigidly attached to a datum with respect to which the member is to be driven, and a second portion adapted to be rigidly attached to the member, the first and second portions being interconnected by one or more first interconnecting members which in the main determine the spring characteristics of the flexural element, and one or more second interconnecting members having a dimension, generally in the direction of drive, less than the corresponding dimension of the or each first interconnecting member, and at least one of the second interconnecting members having drive means attached thereto which, when energised, flexes the associated second interconnecting member which in turn moves the second portion of the flexural element relative to the first portion so as, in use, to oscillate the member to be driven.

The drive mechanism may be of wheel form with either the first portion or the second portion forming the hub, and the remaining portion forming a generally circumferential portion of the wheel, and with the first and second interconnecting members forming spokes and extending generally radially between the hub and circumferential portions. Preferably the or each drive means is in the form of a piezoelectric device.

An arrangement in accordance with this aspect of the invention enables the use of relatively thin (as seen in the general direction of drive) interconnecting members which are relatively easily driven or excited to provide the desired oscillatory motion, with the thicker interconnecting member providing the majority of the stiffness of the flexural element.

According to another aspect of the present invention, there is provided an oscillatory drive mechanism for a member to be driven comprising a flexural element having a first portion adapted to be rigidly attached to a datum with respect to which the member is to be driven, and a second portion adapted to be rigidly attached to the member, the first and second portions being interconnected by one or more interconnecting members at least one of which has drive means bonded thereto which, when energized, flexes the associated first interconnecting member which in turn moves the second portion of the flexural element relative to the first portion so as, in use, to oscillate the member to be driven, said at least one interconnecting member forming a composite beam with the associated drive means with the neutral surface of the beam arranged to be substantially coincident with the bond line between the two beam components.

With this arrangement the material used to bond the drive means to each first interconnecting member is not subjected to any compressive or tensile forces but merely to pure flexing which thus reduces energy losses to a minimum so as to enhance the Q of the drive mechanism.

In either of the two aspects of the present invention referred to above the or each drive means preferably extends only part way along the associated interconnecting member from one end thereof and by an amount such that the point of contraflexure of that member is at the point of termination of the drive means along said member.

Thus according to yet another aspect of the present invention there is provided an oscillatory drive mechanism for a member to be driven comprising a flexural element having a first portion adapted to be rigidly attached to a datum with respect to which the member is to be driven, and a second portion adapted to be rigidly attached to the member, the first and second portions being interconnected by one or more first interconnecting members at least one of which has drive means bonded thereto which, when energised, flexes the associated first interconnecting member which in turn moves the second portion of the flexural element relative to the first portion so as, in use, to oscillate the member to be driven, said at least one first interconnecting member forming a composite beam with the associated drive means and extending only part way therealong from one end by an amount such that the point of contra-flexure of the first interconnecting member is at the point of termination of the drive means along that member.

With this arrangement each drive means is flexed only in one direction so that drive or excitation of the associated interconnecting member is maximized. If each drive means is in the form of a piezoelectric device, for example, then if the point of contraflexure of the associated interconnecting member lies within the piezoelectric device, then the portion of latter extending beyond that point is wasted as regards contributing to the flexing of the member in the desired direction since that portion acts in opposition to the remainder.

When the drive means are in the form of piezoelectric devices, then one of those devices may be used in a pick-off mode, rather than the drive mode, the output from the pick-off being fed to a servo mechanism which controls the drive voltage applied to the drive piezoelectric devices.

A ring laser gyroscope embodying the present invention will now be described in greater detail, by way of example, with reference to the accompanying drawings, in which:

FIG. 2 is a side view from the right of FIG. 1;

FIG. 3 is a part section on the line III—III of FIG. 1,

Figure 1:
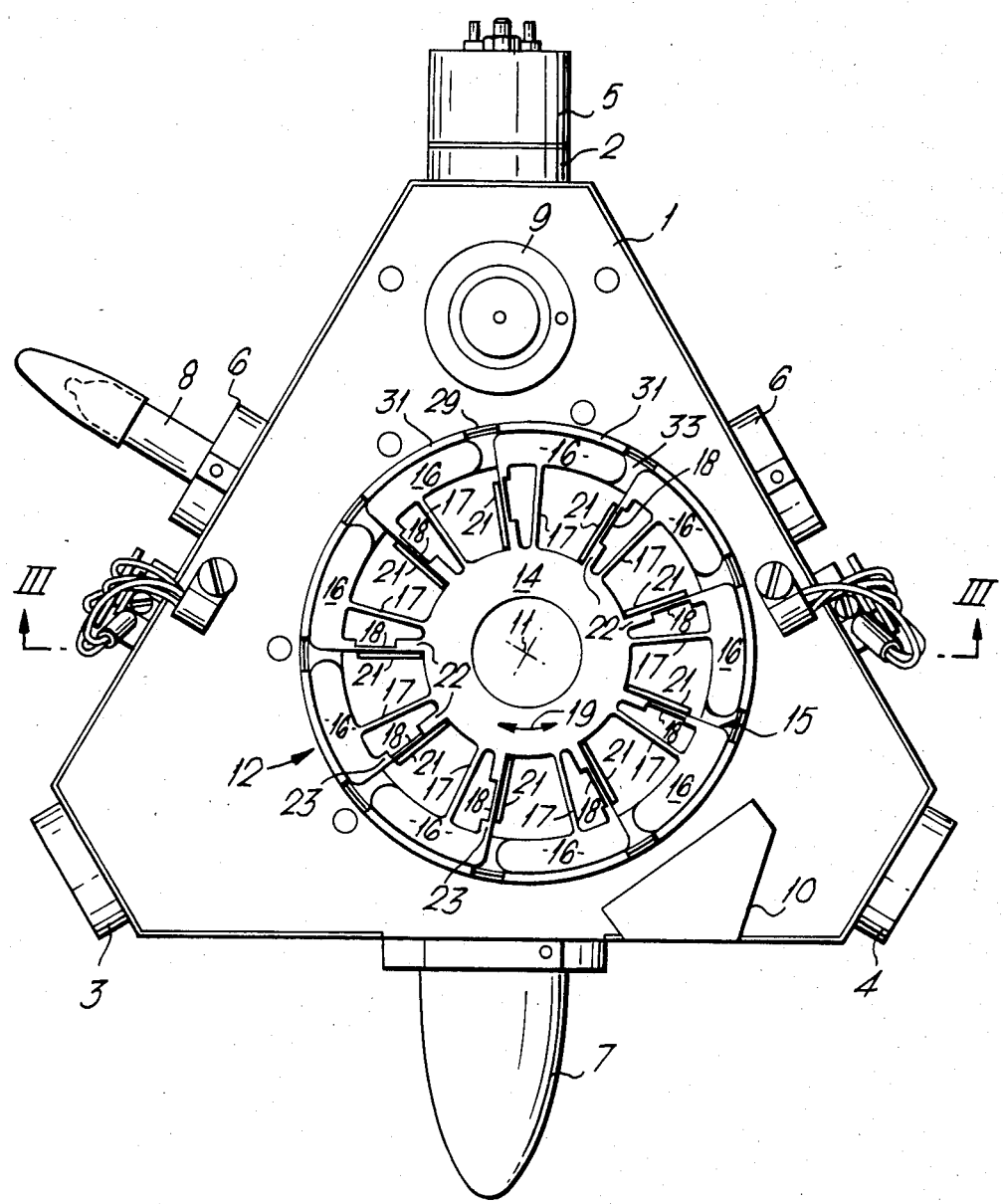
FIG. 1 is a top plan view of the laser gyroscope with certain components removed for clarity.
Figure 4:
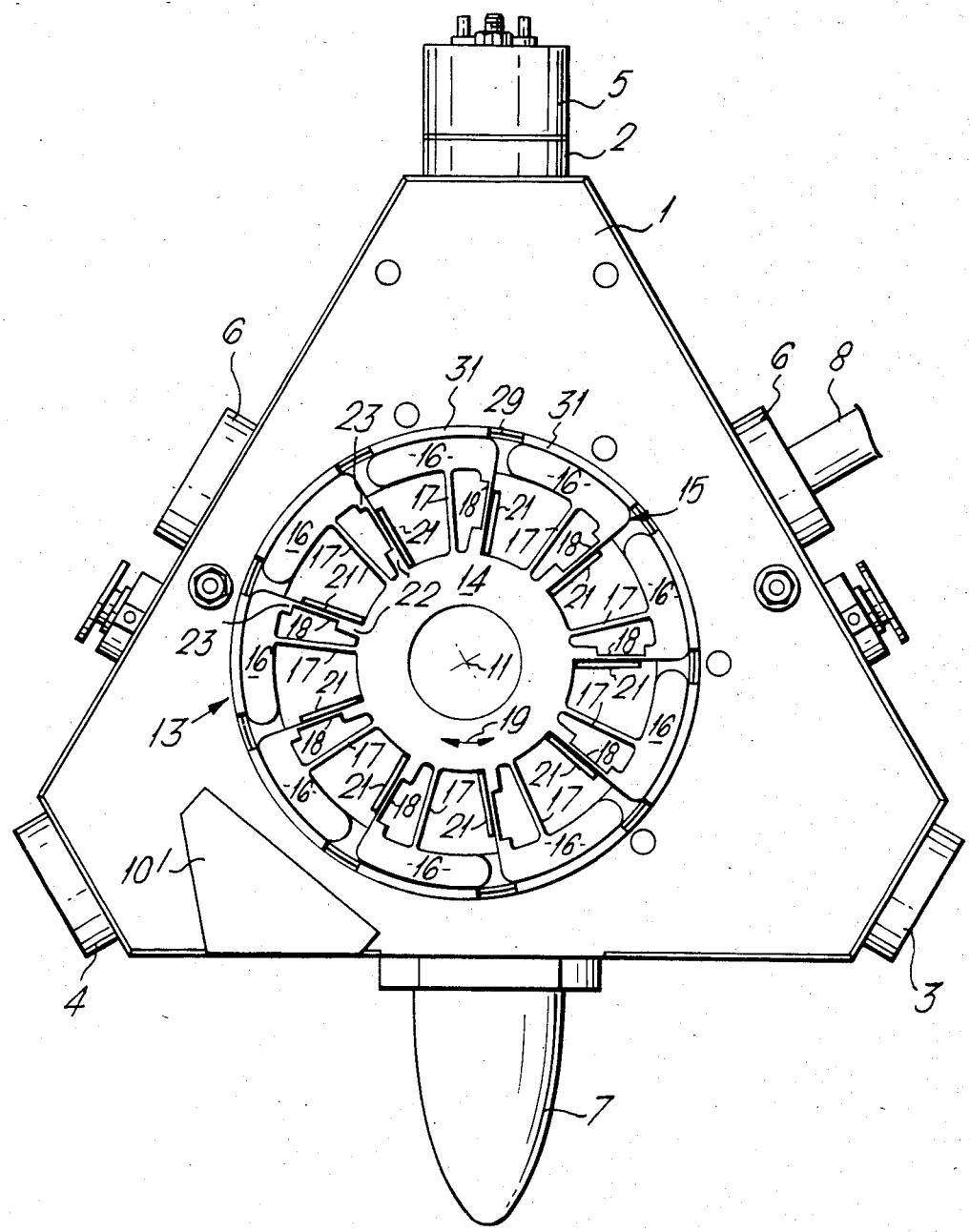
FIG. 4 is a bottom plane view of the laser gyroscope, also with certain components removed for clarity.

The laser gyroscope is of the integral cavity type with the ring laser having three limbs which are formed in a generally triangular block 1 of a material known under the Registered Trade Mark Zerodur, which material has a very low coefficient of expansion. At each transition of two adjacent limbs of the ring there is provided a mirror 2, 3 and 4 which serves to reflect light beams from one limb to the other, whereby the beams are continually propagated around the ring. The mirror 2 is fitted with a piezoelectric device 5 which is operable to move the mirror in accordance with control signals applied to the device, so as to maintain a constant path length around the ring for the beams of light. One of the mirrors 3 and 4 is partially transmissive to provide output beams in the conventional manner, from which are derived any rotational rate to which the gyroscope is subjected. Two anodes 6 and a cathode 7 communicate with respective limbs of the ring and are sealed in a gas tight manner to the cavity, as are the mirrors 2, 3 and 4. One of the anodes 6 is fitted with a fill tube 8, through which the lasing medium is put into the ring, the fill tube being pinched off to seal the medium in the ring. When the anodes 6 and 7 are energized, lasing of the medium within the ring is effected and contra-propagating beams of light are produced, as is conventional. The purity of the lasing medium is maintained by a getter 9 which is also sealed in a gas tight manner to the cavity 1.

In order to minimize the problem of lock-in, a bias is imparted to the gyroscope using the dither method, which oscillates the cavity about the dither axis 11 of ythe gyroscope, which axis passes through the center of gravity of the cavity 1 and which is offset from the geometric center of the cavity. Balancing weights 10 and 10' are provided on opposed faces of the gravity 1. The oscillatory motion is provided by an oscillatory drive mechanism in accordance with the present invention, which mechanism comprises two flexural elements 12,13 fitted to opposed sides of the cavity 1 and each being in the form of a wheel. The flexural elements 12,13 are similar, although it will be noted that they are handed so that in use they aid, rather than oppose, each other in oscillating the cavity 1.

Figure 7:
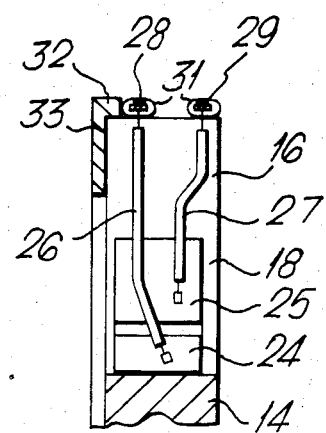
FIG. 7 is a view in the direction of arrow VII of FIG. 5.

The flexural element 12 of FIG. 1 is shown enlarged in FIG. 5 and will now be described in greater detail, it being understood that the element 13 is identical except that it is of the opposite hand. The element 12 has a hub portion 14 and a circumferential portion 15 which is discontinuous, being made up of nine discrete portions 16. The hub and circumferential portions 14,15 are interconnected by radially extending first members or spokes 17 and radially extending second members or spokes 18, one of each being provided between the hub and each discrete circumferential portion 16. The spokes 17 and 18 are formed integrally with the hub and circumferential portions 14,15, and it will be noted that the spokes are relatively thin in the general direction of oscillation indicated at 19 but much thicker in the direction at right angles thereto, whereby the hub and circumferential portions 14,15 are capable of relative movement in the direction 19 but not in any other direction. Furthermore, the spokes 18 are considerably thinner than the spokes 17 in the direction 19 so that the spokes 17 determine, in the main, the spring characteristics of the flexural element, whereas the spokes 18 are used to provide the drive. To this end, each spoke 18 has a piezoelectric device 21 attached, in the form of a slab of piezoelectric material which extends from the hub end of the spoke to a point short of the other end of the spoke as can be seen most clearly in FIG. 7 and at the two o'clock position in FIG. 5. Each spoke 18 has a thickened portion or stub 22,23 where it joins the hub portion 14 and the associated discrete circumferential portion 16, respectively, with the stub 22 being longer, in the radial direction, than the stub 23.

Each piezoelectric device 21 requires an excitation voltage applied across its pair of major faces, namely the face adjacent the spoke 18 and the opposed face. In view of the difficulty of attaching a supply lead to the face adjacent the spoke 18, each piezoelectric device 21 has an electrode extending over that face and around one end of the device so as to return part way along the opposed face as indicated at 24 in FIG. 7. The other face has an electrode 25 applied (spaced from the electrode portion 24) but since the piezoelectric properties of each device 21 are realized only when a voltage differential appears across the faces under discussion, the effective length of the device is dictated by the length of the electrode 25. Thus that part of each device 21 covered by the return portion 24 of the other electrode is ineffective but is conveniently accommodated "behind" the associated stub 22, which in any event does not flex.

Thus each piezoelectric device 21 has a pair of electrical supply leads 26,27 attached to one and the same face, these leads extending to respective bus bars 28,29 fitted around the circumferential portion 15 and insulated by insulating sleeves 31. The bus bars 28 and 29 are disposed axially of the flexural element, with the bus bar 28 resting against a lip 32 of a ring 33 which is soldered or otherwise secured to the discrete circumferential portions 16. This ring 33 is a convenient vehicle for attaching the discrete circumferential portions 16 to the cavity 1 and would not be essential if the circumferential portion 15 were continuous, although the ring does also serve to space the spokes 17,18 from the cavity, which is helpful. The spaces between adjacent circumferential portions 16 conveniently allow the supply leads 26,27 to extend between the piezoelectric devices 21 and the bus bars 28,29, the bus bars and leads being held in position by blobs of material, such as rubber compound, applied between adjacent circumferential portions 16.

The cavity 1 has an aperture 34 (FIG. 3) and the circumferential portions 16 of the flexural elements 12 and 13 are bonded, via the rings 33, to the opposed sides of the cavity 1 in axial alignment with the aperture 34. The rings 33 are ground flat and provided with a coating of gold, as are the appropriate areas on the cavity 1, the bond between mating gold surfaces being completed by an indium ring in accordance with the method disclosed in co-pending U.K. Patent Application No. 81.09608. However, alternative bonding techniques may be employed.

The hub 41 of each flexural element 12,13 is fixedly attached to a spindle (not shown) which itself is attached to a relatively massive mounting (also not shown) so that the hubs 14 can be considered as rigidly fixed to provide a datum with respect to which the circumferential portions 15 are movable on flexure of the spokes 17,18. Thus the cavity 1 is suspended on the flexural elements and will oscillate.

Returning to the piezoelectric devices 21, these are bonded to the spokes 18 to form respective composite beams, the bond being effected by an epoxy resin known under the Registered Trade Mark Araldite and Type No. AV100/HV100. However, other bonding agents may be used. The thickness of the spokes 18 in the direction 19 is chosen such that the neutral surface of the composite beam formed by each spoke 18 and the associated piezoelectric device 21 is coincident with the bond surface between the two components. Thus the bond between the composite beam components is not subjected to any strain by way of compressive or tensile forces, but merely to bending or flexing since this is the characteristic of the neutral surface of a composite beam. Therefore, the energy loss in the bonding agent is minimal, which increases significantly the Q of the drive mechanism. In the illustrated embodiment the spokes 17 have a thickness of approximately 1 mm and the spokes 18 have a thickness of approximately 0.18 mm. Of course, the latter dimension depends on the Young's Modulus of the material used for the flexural element and that of the piezoelectric device and the thickness of the latter. In the present case, the flexural elements are made from metal known as Invar 36 (as it has a coefficient of expansion close to that of Zerodur) and the piezoelectric material is lead zirconate titanate. In practice, it is necessary to select a piezoelectric device and then determine the required thickness of the spokes 18 to achieve the desired coincidence of the neutral surface with the bond line.

Figure 5:
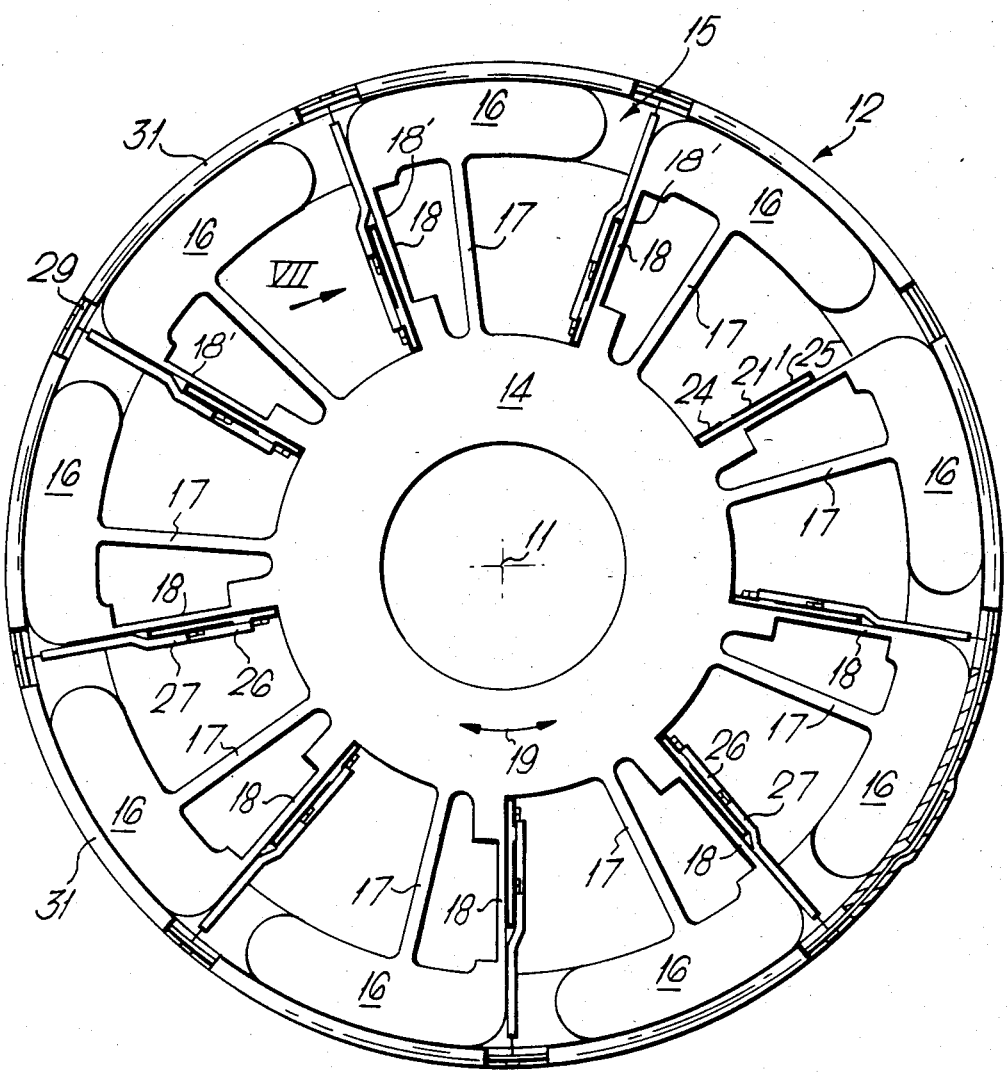
FIG. 5 is an enlarged view of a component of FIG. 1.
Figure 6:
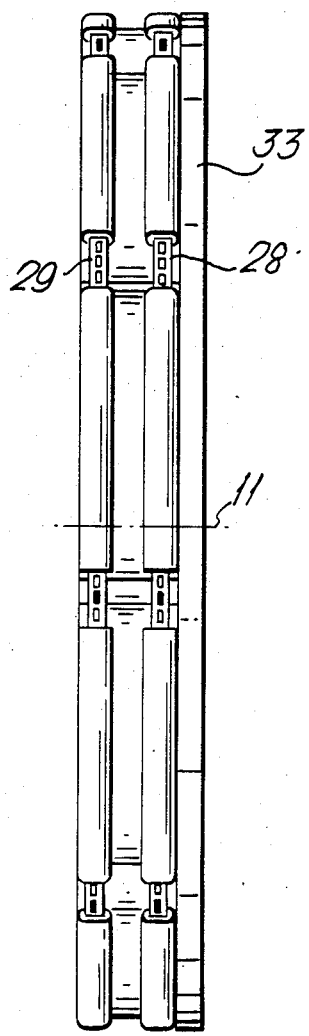
FIG. 6 is a side view from the right of FIG. 5.

The length of each spoke 18 between the stubs 22,23 is 9 mm and the effective length of each piezoelectric device is 7 mm., the latter dimension being chosen to ensure that the point of contraflexure of each spoke 18 is at the point of termination of the device 21 along that spoke as shown, for example, at 18' in FIG. 5. This maximizes the effective length of each piezoelectric device 21. If the point of contraflexure of each composite beam formed by the spokes 18 and the piezoelectric devices 21 were to be within the piezoelectric device, then the effective length of the latter would be shortened by an amount equal to the distance of the point of contraflexure from the end of the device adjacent the circumferential portion 15 of the flexural element 12,13.

Each piezoelectric device 21 (except that indicated at 21' at the two o'clock position in FIG. 5) is operated in the so-called $d_{31}$ mode which means that the device extends in a direction at right angles to the applied electric field. Since the electric field is applied across the two major faces of each device 21, then extension occurs in a direction parallel to the associated spoke 18. This means that the associated spoke 18 flexes or bends in one direction or another dependent upon the polarity of the applied voltage. As the spokes 18 are thus flexed or bent on application of the driving voltage to the piezoelectric devices 21, the circumferential portion 15 of each flexural element 12,13 moves relative to the hub 14, in one direction. As far as the cavity 1 is concerned, this movement in the two flexural elements 12,13 is in the same direction because, as already mentioned, the flexural elements are of opposite hand. When the driving voltage is reversed, the spokes 18 (and the spokes 17 which also flex on movement of the circumferential portions 15) flex in the opposite direction. Thus if the drive voltage is applied at the appropriate intervals, first of one polarity and then of the opposite polarity, the circumferential portions 15 will oscillate continuously and carry with them the cavity 1 which thus has imparted to it the desired bias to remove, or minimize, the problem of lock-in. It will be appreciated that the frequency of the driving voltage is chosen to suit the resonance of the overall drive mechanism, which often lies in the range of 100 to 300 Hz but could have other values.

In a laser gyroscope employing flexural elements of a known kind, the Q of the drive mechanism has typically been of the order of 50 to 100. However, with the use of the present invention a very significant increase in Q has been obtained, namely an increase up to 200.

The piezoelectric device 21' appearing at the two o'clock position in FIG. 5 is not employed in the drive mode but in a pick-off mode. Thus as the associated spoke 18 flexes as a result of the energization of the other piezoelectric devices 21, the device 21' flexes and thus undergoes an extension which produces a voltage across its major faces. This voltage is applied to a servo mechanism (not shown) which controls the voltage applied to the drive piezoelectric devices 21. The leads used to take off the voltage generated across the device 21' have not been shown in FIG. 5 and indeed none of the supply leads 25,27 have been shown in FIGS. 1 to 4 for reasons of clarity.

The flexural elements 12 and 13 shown in the drawings are manufactured using the wire cutting technique but they may be produced in other ways. It may be possible in some applications employing two flexural elements to drive only one of them, and it is also possible to arrange for the driven interconnecting members to operate in a push-pull fashion, although this requires either two separate voltage supplies (one for the "push" devices and one for the "pull" devices) or the opposite poling of the respective piezoelectric devices.

It will be apparent that an oscillatory drive mechanism in accordance with the present invention has application in other than a laser gyroscope.

We claim:

1. An oscillatory drive mechanism for a member to be driven comprising:

a flexural element having first and second portions, the first portion being adapted to be rigidly attached to a datum with respect to which the member is to be driven and the second portion being adapted to be rigidly attached to the member, the first and second portions being interconnected by at least one drive unit;

the drive unit comprising first and second interconnecting members, and drive means bonded to the second interconnecting member;

the second interconnecting member having a dimension generally in the direction of drive, which is less than the corresponding dimension of the first interconnecting member, the first interconnecting member, in the main, determining the spring characteristics of the flexural element;

the mechanism being in the form of a wheel with one of the first portion and the second portion forming the hub, and the other portion forming a generally circumferential portion of the wheel with the first and second interconnecting members of each of the drive units extending generally radially between the hub and circumferential portions;

the drive means being operable, when energized, to flex the second interconnecting member which in turn moves the second portion of the flexural element relative to the first portion so as, in use, to oscillate the member to be driven.

2. A mechanism according to claim 1, wherein the drive means is in the form of a piezoelectric device.

3. A mechanism according to claim 2, wherein the piezoelectric device comprises a slab of piezoelectric material having electrodes extending from one face around the end of the slab to the opposed face, whereby electrical connections can be made to one and the same face.

4. A mechanism according to claim 1, wherein the drive means is bonded to its associated second interconnecting member to form a composite beam with the neutral surface of the beam arranged to be substantially coincident with the bond surface between the two beam components.

5. A mechanism according to claim 1, wherein the drive means extends only part way along the associated second interconnecting member from one end thereof and by an amount such that the point of contra-flexure of that member is at the point of termination of the drive means along the member.

6. A dither drive mechanism for a ring laser gyroscope comprising a flexural element in the form of a wheel having first and second portions, which are interconnected by at least one drive unit;

the first portion being in the form of the hub of the wheel and adapted to be rigidly attached to a datum with respect to which the gyroscope is to be driven, and the second portion being in the form of a generally circumferential portion of the wheel and adapted to be rigidly attached to the gyroscope, and the drive units extending between the hub and circumferential portions;

the drive unit comprising first and second interconnecting members each extending generally radially between the hub and the circumferential portions, and drive means bonded to the second interconnecting member;

the second interconnecting member having a dimension, generally in the direction of drive, which is less than the corresponding dimension of the first interconnecting member, the first interconnecting member, in the main, determining the spring characteristics of the flexural element;

the drive means being bonded to its associated second interconnecting member to form a composite beam with the neutral surface of the beam arranged to be substantially coincident with the bond line between the two beam components, and extending only part way along the member from one end thereof by an amount such that the point of contra-flexure of that member is at the point of termination of the drive means along the member;

the drive means being operable, when energized, to flex the second interconnecting member which in turn moves the circumferential portion of the flexural element relative to the hub so as, in use, to oscillate the ring laser gyroscope.

7. A mechanism according to claim 1, wherein the first and second interconnecting members of the drive unit are formed integrally with the first and second portions of the flexural element.

8. A mechanism according to claim 1, whrein the first interconnecting member of the drive unit is formed integrally with the first and second portions of the flexural element.

9. A mechanism according to claim 1, wherein the circumferential portion is discontinuous.

10. A mechanism according to claim 1, wherein the drive means is in the form of a piezoelectric device.

11. A mechanism according to claim 10, wherein the piezoelectric device comprises a slab of piezoelectric material having electrodes extending from one face around the end of the slab to the opposed face, whereby electrical connections can be made to one and the same face.

12. A mechanism according to claim 11, wherein the electrical connections extend from the piezoelectric devices to respective bus bars fitted around the circumferential portion.

13. A mechanism according to claim 1, wherein the drive means is bonded to its associated second interconnecting member to form a composite beam with the neutral surface of the beam arranged to be substantially coincident with the bond surface between the two beam components.

14. A mechanism according to claim 1, wherein the drive means extends only part way along the associated second interconnecting member from one end thereof and by an amount such that the point of contra-flexure of that member is at the point of termination of the drive means along the member.

* * * * *